US008855030B2

(12) United States Patent  
Kruglick

(10) Patent No.: US 8,855,030 B2  
(45) Date of Patent: Oct. 7, 2014

(54) SUPPRESSION OF DISCOVERY OF MOBILE DEVICES IN A WIRELESS NETWORK

(75) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 511 days.

(21) Appl. No.: 13/121,964

(22) PCT Filed: Dec. 1, 2010

(86) PCT No.: PCT/US2010/058486  
§ 371 (c)(1),  
(2), (4) Date: Mar. 31, 2011

(87) PCT Pub. No.: WO2012/074520  
PCT Pub. Date: Jun. 7, 2012

(65) Prior Publication Data  
US 2012/0140622 A1 Jun. 7, 2012

(51) Int. Cl.  
*H04B 7/00* (2006.01)  
*H04W 8/00* (2009.01)
(52) U.S. Cl.  
CPC .................................. *H04W 8/005* (2013.01)  
USPC .................. 370/310; 455/432.1; 709/227
(58) Field of Classification Search  
USPC ........................... 455/433; 370/252  
See application file for complete search history.

(56) References Cited

U.S. PATENT DOCUMENTS

| | | | |
|---|---|---|---|
| 7,565,144 B2 * | 7/2009 | Saifullah et al. | 455/436 |
| 7,594,268 B1 * | 9/2009 | Sobel | 726/23 |
| 7,685,288 B2 | 3/2010 | Kakivaya et al. | |
| 7,996,031 B2 * | 8/2011 | Kiiskila et al. | 455/519 |
| 8,363,590 B2 * | 1/2013 | Mathews et al. | 370/315 |
| 2004/0258008 A1 * | 12/2004 | Inoue et al. | 370/312 |
| 2005/0215195 A1 | 9/2005 | Light et al. | |
| 2006/0259624 A1 * | 11/2006 | Hu et al. | 709/226 |
| 2007/0214254 A1 * | 9/2007 | Aguinik | 709/224 |
| 2007/0245033 A1 * | 10/2007 | Gavrilescu et al. | 709/230 |
| 2008/0080388 A1 * | 4/2008 | Dean et al. | 370/252 |

(Continued)

FOREIGN PATENT DOCUMENTS

JP 2009027353 A 2/2009

OTHER PUBLICATIONS

Friday, et al., "Supporting Service Discovery, Querying and Interaction in Ubiquitous Computing Environments", 2004, *Wireless Networks*, 10(6): 631-641.

(Continued)

*Primary Examiner* — Anh-Vu Ly  
*Assistant Examiner* — Deepa Belur  
(74) *Attorney, Agent, or Firm* — Hope Baldauff, LLC

(57) ABSTRACT

Technologies are generally described for suppressing discovery of mobile devices in a wireless ubiquitous computing (ubicomp) network, reducing the number of network transmissions by devices in the network and reducing network congestion and prolonging battery life. A mobile device may add supplementary information to introductory beacons transmitted by the device that indicate no response is necessary from other devices participating in the network except for a coordinator of the network. The mobile device may transmit a malformed introductory beacon that will be ignored by other devices in the network except for the coordinator. The coordinator of the wireless network may detect the mobile device moving through the network and transmit a suppression signal to other devices in the network causing the devices to ignore the introductory beacons transmitted by the mobile device.

14 Claims, 5 Drawing Sheets

(56) References Cited

U.S. PATENT DOCUMENTS

| | | |
|---|---|---|
| 2008/0170549 A1* | 7/2008 | Everson et al. ............... 370/338 |
| 2009/0157839 A1* | 6/2009 | Diederichs et al. ........... 709/208 |
| 2009/0245133 A1 | 10/2009 | Gupta et al. |
| 2009/0252128 A1 | 10/2009 | Yang et al. |
| 2009/0262663 A1 | 10/2009 | Gosset et al. |
| 2009/0311963 A1* | 12/2009 | Haverty ....................... 455/63.1 |
| 2010/0141762 A1 | 6/2010 | Siann et al. |
| 2010/0226297 A1 | 9/2010 | Kasslin et al. |
| 2010/0234056 A1 | 9/2010 | Goto |

OTHER PUBLICATIONS

Sud, et al., "Enabling Rapid Wireless System Composition Through Layer-2 Discovery", 2008, IEEE Network 22(4): 14-20.

Vasudevan et al., "Neighbor Discovery in Wireless Networks and the Coupon Collector's Problem", 2009, Proceedings of the 15$^{th}$ Annual International Conference on Mobile Computing and Networking, 181-192.

International Search Report dated Feb. 18, 2011 in International Application No. PCT/US10/058486.

* cited by examiner

US 8,855,030 B2

SUPPRESSION OF DISCOVERY OF MOBILE DEVICES IN A WIRELESS NETWORK

BACKGROUND

Unless otherwise indicated herein, the materials described in this section are not prior art to the claims in this application and are not admitted to be prior art by inclusion in this section.

Ubiquitous computing (ubicomp) depends heavily on wireless networking technology to support the automatic participation of many everyday objects in a computing environment. Example solutions for wireless communications for networks of ubicomp devices include wireless local area network (WLAN) technology or wireless personal area network (WPAN) technology. Related network solutions may include BLUETOOTH, ZIGBEE, WIRELESSHART, WI-FI, MIFI, and various other wireless communication solutions and technologies promulgated by the IEEE 802 working groups.

A wireless ubicomp network may have many devices participating in the network. For example, a ZIGBEE network implemented in a home may have hundreds of connected devices, including light switches, outlets, thermostats, appliances, remote controls, motion sensors, security sensors, controllers, coordinating devices, and the like. Many of these devices may be connected to a fixed power supply, while others may operate on battery power. In addition, some of the devices, such as light switches, outlets, and thermostats, may be fixed at a particular location, while others, such as remote controls and key fobs, may be "mobile" and move throughout the home.

A device in the ubicomp network may communicate directly with other devices within range of the wireless transmissions. In addition, some devices may forward or repeat transmissions to other devices within range, allowing a tree or mesh networking topology to be constructed. A device in the network may discover the other devices within range by broadcasting an introductory beacon, typically during a designated beacon period. The device may then listen for responses to the introductory beacon and exchange information with the responding devices, such as the identity of the network, the type of the responding device, other remote devices reachable through a responding device, and the like.

While it may take significant energy to engage in this device discovery process, the process is typically only performed on the occasion of a new device being added to the wireless ubicomp network. However, a mobile device moving through the physical topology of the network may cause a cascade of device discovery processes, as the mobile device moves out-of-range of one set of devices on the network and in-range of a new set of devices. This repetition of the discovery process may be compounded in WPAN ubicomp networks, such as a ZIGBEE network, that have significantly smaller wireless communication range, often in the single-digit meters. The repetition of the discovery process in a short-range wireless network with high mobility devices can lead to network congestion and increased power usage, dramatically reducing the operational life of battery-powered devices in the network.

SUMMARY

The present disclosure generally describes some computer-implemented methods for reducing network transmissions in a wireless ubicomp network by suppressing responses to introductory beacons transmitted by a mobile device moving through the network. According to some example methods, the mobile device adds supplementary information to the introductory beacons indicating that no response to the introductory beacons is necessary by other devices participating in the network except for the coordinator. In other example methods, the mobile device transmits a malformed introductory beacon that will be ignored by other devices in the network except for the coordinator. In yet further example methods, the coordinator of the wireless network detects the mobile device moving through the network and transmits a suppression signal to other devices in the network causing the devices to ignore the introductory beacons transmitted by the mobile device.

The present disclosure generally describes some computer-readable storage media. Some example computer-readable storage media include computer-executable instructions stored thereon that, when executed by a mobile device in a wireless ubicomp network, cause the mobile device to add supplementary information to introductory beacons transmitted by the mobile device that indicated no response is necessary from other devices participating in the network except for the coordinator of the network. Other example computer storage media include computer-executable instructions stored thereon that, when executed by a coordinator of a wireless ubicomp network, cause the coordinator to detect a mobile device moving through the network and transmit a suppression signal to the devices participating in the network that cause some of the devices to ignore any introductory beacons transmitted by the mobile device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

Figure 1:
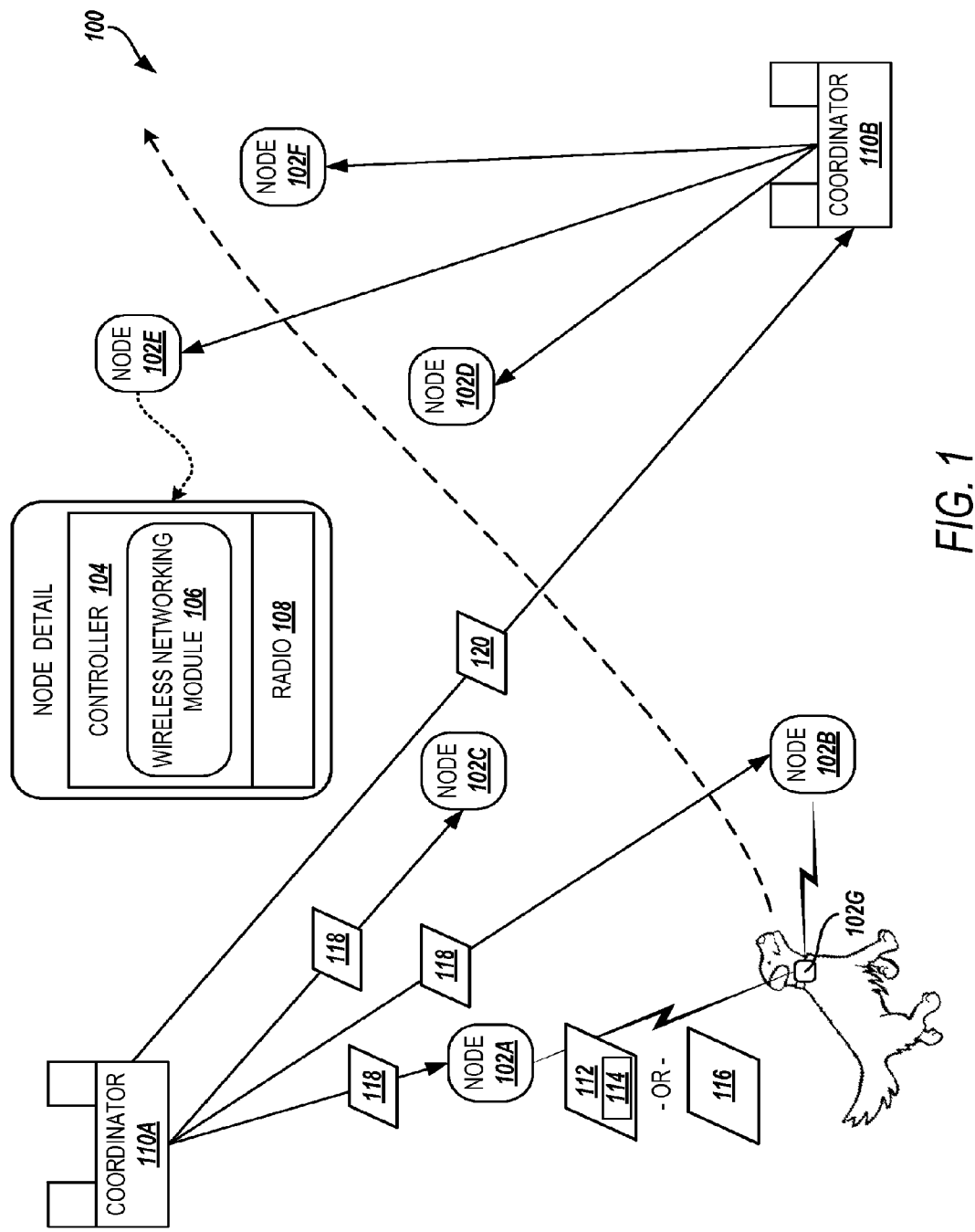
FIG. 1 is a block diagram illustrating an example operating environment of a wireless ubicomp network.

all arranged according to at least some embodiments presented herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures can be arranged, substituted, combined, separated, and designed in a wide variety of different configurations, all of which are explicitly contemplated herein.

This disclosure is generally drawn, inter alia, to methods, apparatus, systems, and computer program products related to suppressing responses to introductory beacons transmitted by mobile devices in a wireless network. In a wireless network having a large number of ubicomp devices, a mobile device moving through the physical topology of the network may cause a cascade of device discovery processes, as the mobile device moves out-of-range of one set of devices on the network and in-range of a new set of devices. This repetition of the discovery process may lead to increased network transmissions within the network as well as increased power usage of other devices in the network, dramatically reducing the operational life of battery-powered devices.

According to embodiments described herein, a mobile device may add supplementary information to introductory beacons transmitted by the device that indicate no response is necessary from other devices participating in the network except for a coordinator of the network. Alternatively, the mobile device may transmit a malformed introductory beacon that will be ignored by some of the other devices in the network except for the coordinator. In addition, the coordinator of the wireless network may detect a mobile device moving through the network and transmit a suppression signal to the other devices causing some of the devices to ignore the introductory beacons transmitted by the mobile device. By suppressing responses to the introductory beacons of mobile devices moving through the wireless network, the number of network transmissions in the network can be reduced and the battery life of battery-powered devices can be prolonged.

FIG. 1 is a block diagram illustrating an example operating environment including an illustrative wireless network 100, arranged according to at least some embodiments presented herein. The wireless network 100 may include any number of devices, or "nodes" 102A-102G. The nodes 102A-102G may be referred to collectively, or in general, as nodes 102. As further shown in FIG. 1, each of the nodes 102 may include a controller 104. The controller 104 can be configured to perform various control and/or communication operations associated with the node 102. For example the controller 104 may include a wireless networking module 106 configured to perform the discovery process between nodes 102 in the wireless network 100 as well as carry out the techniques described herein for suppressing responses to introductory beacons transmitted by mobile devices. The controller 104 may also be configured to interface with a radio 108 to provide wireless networking services for the node 102 on the wireless network 100. The controller 104 may include various other modules, wherein each module may be an electronic circuit, a state machine, a programmable device, a microcontroller, a microprocessor, a central processing unit (CPU), a computer program, a software module, a firmware modules, any other type of controlling mechanism, or any combination thereof.

The nodes 102 may be embedded in ubicomp devices, such as light switches, outlets, thermostats, appliances, remote controls, motion sensors, security sensors, controllers, or the like, and configured to communicate with one another over the wireless network 100. According to some embodiments, the wireless network 100 may be a wireless personal-area network (WPAN), such as a ZIGBEE® network from ZIG-BEE ALLIANCE of San Ramon, Calif. The controller 104 and radio 108 included in each of the nodes 102 in the wireless network 100 may be configured to communicate with the other nodes and devices participating in the wireless network 100 based on the ZIGBEE specification. The nodes 102 participating in the ZIGBEE network may also be referred to as ZIGBEE devices.

It will be appreciated that each of the nodes 102 of the wireless network 100 may communicate with the other nodes of the wireless network 100 according to other wireless protocols and specifications, including, but not limited to, the BLUETOOTH® specification from BLUETOOTH SIG, INC. of Bellevue, Wash.; the WIRELESSHART specification from HART COMMUNICATION FOUNDATION of Austin, Tex.; the WI-FI™ protocol from WI-FI ALLIANCE or Austin, Tex.; or the MIFI® specification from NOVATEL WIRELESS, INC. of San Diego, Calif. It will be further appreciated that an overall network of nodes 102 and other devices may include devices connected both wirelessly and wired using multiple protocols and specifications.

According to some embodiments, the wireless network 100 may further include one or more special nodes acting in a master or coordinating role, referred to as "coordinators" 110A, 110B. The coordinators 110A, 110B may be referred to collectively, or in general, as coordinators 110. The coordinators 110 may be responsible for establishing the wireless network 100, registering the various other nodes 102A-102G of the wireless network 100, and maintaining full knowledge of the network topology. Because of the role of the coordinators 110 in the wireless network 100, the coordinators 110 may tend to be embedded in the most capable devices in the ubicomp network with enhanced computing power and, in most cases, a household A/C or other continuous power source.

Based on the number of nodes 102 participating in the wireless network 100 and the wireless protocol utilized, the wireless network 100 may be established utilizing a tree or mesh topology. Some of the nodes 102 of the wireless network 100 may receive wireless messages from neighboring nodes or devices and forward the messages to the specified recipient through the networking topology. These nodes 102 may be referred to as "router nodes." Router nodes may maintain information regarding others of the nodes 102 in the wireless network 100 in proximity to the router node, as well as network paths and costs to those nodes and other remote destinations in the wireless network 100.

Router nodes may retain the ability to both transmit messages and receive messages from other nodes and devices in the wireless network 100, as well as participate in the device discovery process. For example, a battery-powered node 102A embedded in a thermostat may transmit temperature or humidity changes to other nodes 102B-102F on the wireless network 100 as well as receive HVAC commands from the other nodes. Further, the thermostat device may wish to be discoverable so that it may be controlled by sensors, remote controls, computer gateways, or other devices on the wireless network 100.

Others of the nodes 102 in the wireless network 100 may only transmit messages to the coordinator 110 or nearest router node, and may not receive transmissions from neighboring devices. These nodes may be referred to as "end devices" and may only be known to the coordinator 110 for the wireless network 100 and possibly a neighboring router node 102. End devices may include simple battery-powered devices, such as a security sensor, that only periodically transmit messages on the wireless network 100. For example, a battery-powered motion detector may periodically transmit a message to the coordinator 110, perhaps through a neighboring router node, to inform the coordinator 110 that the motion detector remains functional in the wireless network 100. The motion detector may also transmit a message to the coordinator 110 when motion is detected. Such end devices may operate at this reduced functionality level in order to prolong the battery life of the device.

Yet others of the nodes 102 may be mobile and change position in the physical topology of the wireless network 100 on a regular basis. Mobile devices may include both router nodes 102 and end devices. For example, the mobile node 102G including a device embedded on a dog collar may transmit the dog's presence or location to the coordinator 110 and other nodes 102A-102B on the wireless network 100 in proximity to the dog collar. Other examples of mobile nodes 102G may include remote controls, key fob controllers, portable music players, handheld computing devices, or the like. It will be appreciated that such mobile devices are often battery-powered and may also need to be discoverable in order to accommodate the desired functionality.

As the mobile node 102G moves through the physical topology of the wireless network 100, the mobile node 102G may repeatedly move out-of-range of one set of nodes 102 in the wireless network 100 and in-range of a new set of nodes or devices. This may trigger the occurrence of repeated discovery processes on the wireless network 100. The discovery process may typically occur when an unfamiliar node 102 sounds off during a beacon period on the wireless network 100. The beacon period may be initiated by the coordinator 110 of the wireless network 100, for example.

During the beacon period, the mobile node 102G may introduce itself to surrounding nodes 102 or devices by broadcasting a special message, referred to herein as an introductory beacon 112. Nodes 102A, 102B within receiving range of the mobile node 102G may typically respond to the introductory beacon 112 by broadcasting introductory beacons to establish mutual knowledge. The mobile node 102G may then exchange information with the responding nodes 102A, 102B, such as the identity of the wireless network 100, the type of the responding node, other remote nodes reachable through the responding node, or the like. The discovery process may take place over one or more consecutive beacon periods on the wireless network 100.

It will be appreciated that in a large wireless network, potentially including hundreds or thousands of ubicomp devices, a single moving mobile node 102G could trigger hundreds of wireless transmissions at any given time. This increased messaging could impede normal network usage. In addition, when the responding nodes are located in battery-powered devices, such as the node 102A embedded in a thermostat device, the increased messaging may significantly reduce the operational life of the devices on the wireless network 100. Moreover, there may be multiple mobile nodes 102G moving through the physical topology of the wireless network 100 at any point in time, further compounding these issues.

Figure 2:
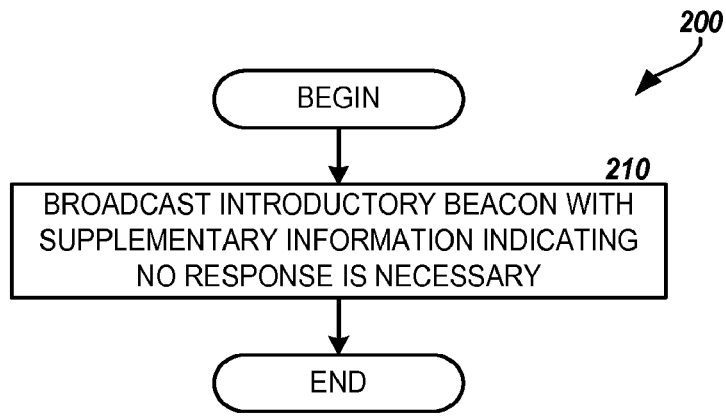
FIGS. 2-4 are flow diagrams illustrating example methods for suppressing discovery of mobile devices in a wireless network.
Figure 3:
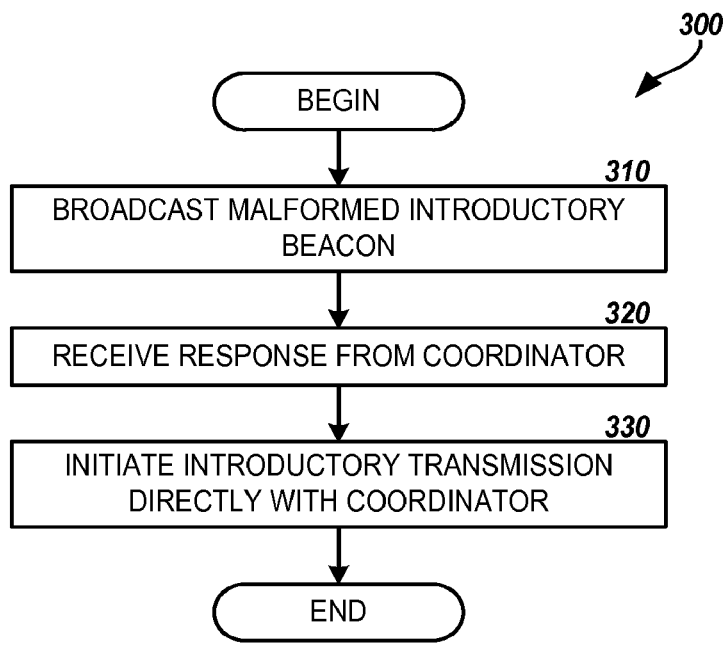
Figure 4:
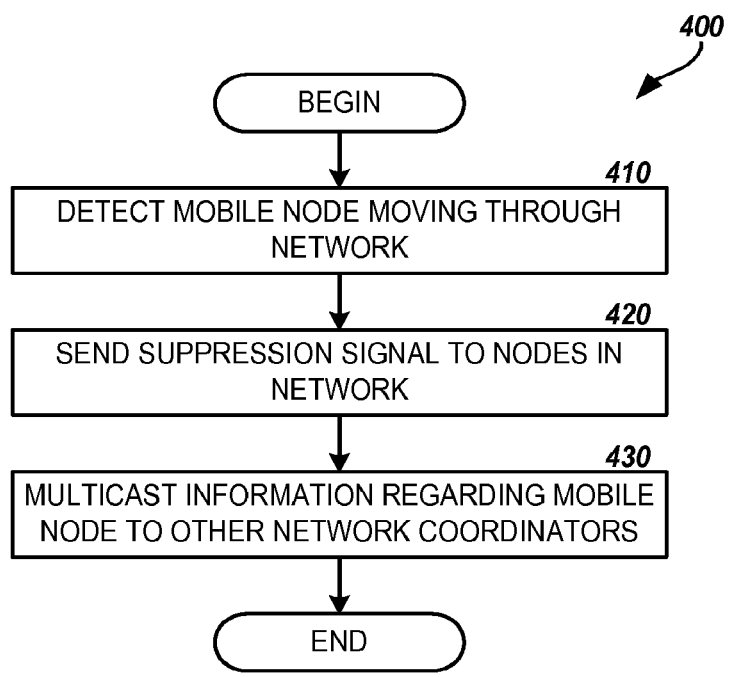

In order to reduce the increased network messaging created by the repeated discovery process, a number of methods may be implemented to suppress the response of one or more nodes 102 in the wireless network 100 to the introductory beacons broadcast by a mobile node 102G moving through the wireless network 100, according to some embodiments. Referring now to FIGS. 2-4, additional details will be provided regarding the embodiments presented herein for suppressing responses to introductory beacons transmitted by the mobile node 102G. It should be appreciated that the blocks described herein may be implemented as a sequence of computer implemented instructions or program modules running on a computing device, as interconnected machine logic circuits or circuit modules within the computing device, or some combination thereof. The implementation is a matter of choice dependent on the performance and other requirements of the various embodiments. Some of the logical operations described herein are referred to variously as state operations, functions, structural devices, actions, or modules. These operations, functions, structural devices, actions and modules may be implemented in software, in firmware, in special purpose digital logic, and any combination thereof. It should also be appreciated that in some implementations one or more of the illustrated blocks may be eliminated, combined or separated into additional blocks than those shown in the figures and described herein. These blocks may also be performed sequentially, in parallel, or in a different order than those described herein.

FIG. 2 is a flow diagram illustrating a process 200 for suppressing the response of one or more nodes 102 in the wireless network 100 to the introductory beacons 112 broadcast by a mobile node 102G moving through the wireless network 100, according to at least some embodiments presented herein. The process 200 may be performed by the wireless networking module 106 on the mobile node 102G, or by a combination of modules and components on the mobile node 102G, the coordinator 110, and/or other nodes and devices in the wireless network 100. The process 200 may include one or more operations, functions or actions as illustrated by block 210 in FIG. 2.

The process 200 may begin at block 210 (broadcast introductory beacon with supplementary information indicating no response is necessary), where the wireless networking module 106 on the mobile node 102G may be configured to broadcast an introductory beacon 112 with supplementary information 114 included in the message that indicates to other nodes 102 of the wireless network 100 that no response is necessary unless the node is the coordinator 110. As described above in regard to FIG. 1, the introductory beacons 112 may be broadcast by the mobile node 102G during a beacon period established by the coordinator 110 of the wireless network 100. According to some embodiments, the supplementary information 114 may be added to the introductory beacon 112 in extra bytes of the beacon message, as defined by the specification or protocol of the wireless network 100. For example, in a ZIGBEE network, the supplementary information 114 may be placed in the unused flag number $FC. After block 210, the process 200 may either repeat (e.g., periodically, continuously, or on demand as needed) or terminate.

The process 200 may allow the mobile node 102G to broadcast both discovery information and a suppression signal in the beacon period. Other nodes 102 in the wireless network 100 may choose to ignore the introductory beacon 112 containing the supplementary information 114 or to respond, depending on the configuration of the node or device. For example, the node 102A embedded in the battery-powered thermostat device may choose not to respond to introductory beacons 112 containing the supplementary information 114 in order to prolong battery life, while another node 102 in a device with a fixed power supply may respond to such introductory beacons.

If the mobile node 102G does not receive a response to the introductory beacon 112 containing the supplementary information 114, then the mobile node 102G may choose to send a conventional introductory beacon 112 without the supplementary information 114 in a subsequent beacon period.

According to some further embodiments, the coordinator 110 for the wireless network 100 may respond to introductory beacons 112 from the mobile node 102G regardless of the presence or absence of the supplementary information 114. It will be appreciated that the process 200 may only be successful in suppressing discovery of the mobile node 102G if one or more of the other nodes 102 in the wireless network 100 are configured to read and understand the supplementary information 114 contained in the introductory beacons 112. This may require, in at least some implementations, an extension to or modification of the specification or protocol of the wireless network 100.

FIG. 3 is a flow diagram illustrating another process 300 for suppressing the response of one or more nodes 102 in the wireless network 100 to the introductory beacons 112 broadcast by a mobile node 102G moving through the wireless network 100, according to at least some embodiments presented herein. The process 300 may be performed by the wireless networking module 106 on the mobile node 102G, or by a combination of modules and components on the mobile node 102G, the coordinator 110, and/or other nodes and devices in the wireless network 100. Process 300 may include one or more operations, functions or actions as illustrated by blocks 310, 320, and 330 in FIG. 3. The process 300 may begin at block 310 (broadcast malformed introductory beacon). Block 310 may be followed by block 320 (receive response from coordinator). Block 320 may be followed by block 330 (initiate introductory transmission directly with coordinator). After block 330, processing may either repeat (e.g., periodically, continuously, or on demand as needed) or terminate. Further details about each block will be described below.

At block 310 (broadcast malformed introductory beacon), the wireless networking module 106 on the mobile node 102G may be configured to broadcast a purposely malformed introductory beacon 116, such that other nodes 102 in the wireless network 100 will ignore the broadcasts and only the coordinator 110 will respond to the introductory beacons. The message type, format, and content of the malformed introductory beacon 116 may depend on the specification or protocol of the wireless network 100. For example, in a ZIGBEE network, the mobile node 102G may broadcast a router cost table update message containing invalid or unrealistic values. Router nodes 102 in the ZIGBEE network may be configured to ignore the router cost table update messages, and therefore will not respond to malformed introductory beacons 116 broadcast by the mobile nodes 102G.

According to some embodiments, the coordinator 110 of the wireless network 100 may receive the malformed introductory beacon 116, perhaps through one or more router nodes 102 on the wireless network 100, and may respond directly to the mobile node 102G. For example, in the ZIGBEE network, the coordinator 110 may be configured to, upon parsing the invalid or unrealistic values in the router cost table update message, respond directly to the mobile node 102G indicating that an invalid router cost table update message was received.

At block 320 (receive response from coordinator), the wireless networking module 106 on the mobile node 102G may receive the response to the malformed introductory beacon 116 from the coordinator 110.

At block 330 (initiate introductory transmission directly with coordinator), upon receiving the response from the coordinator 110, the wireless networking module 106 on the mobile node 102G may be configured to initiate an introductory transmission directly with the coordinator 110, bypassing other nodes 102 of the wireless network 100. For example, the mobile node 102G may engage in a unicast discovery process directly with the coordinator 110 as defined by the specification or protocol of the wireless network 100, instead of broadcasting introductory beacons 112 to some or all nodes 102 within range of the mobile node. The unicast discovery process may take place in subsequent beacon periods. After block 330, the process 300 may either repeat (e.g., periodically, continuously, or on demand as needed) or terminate.

The process 300 may be backward compatible with the specification or protocol of the wireless network 100, and therefore neither the coordinator 110 nor the other nodes 102 on the wireless network 100 may need to be reconfigured in order for the process to successfully suppress the response of the nodes to the malformed introductory beacons 116 sent by the mobile node 102G. However, the process 300 may require, in at least some implementations, the extra operation of broadcasting the malformed introductory beacons 116, lengthening the overall discovery process for the mobile node 102G.

FIG. 4 is a flow diagram illustrating a further process 400 for suppressing the response of one or more nodes 102 in the wireless network 100 to the introductory beacons 112 broadcast by a mobile node 102G moving through the network, according to at least some embodiments presented herein. The process 400 may be performed by the wireless networking module 106 on the coordinator 110A of the wireless network 100, or may be performed by a combination of modules and components on the coordinators 110, the mobile node 102G, and/or other nodes and devices in the wireless network 100. The process 400 may include one or more operations, functions or actions as illustrated by blocks 410, 420, and 430 in FIG. 4. The process 400 may begin at block 410 (detect mobile node moving through network). Block 410 may be followed by block 420 (send suppression signal to nodes in network). Block 420 may be followed by block 430 (multicast information regarding mobile node to other network coordinators). After block 430, processing may either repeat (e.g., periodically, continuously, or on demand as needed) or terminate. Further details about each block will be described below.

At block 410 (detect mobile node moving through network), the wireless networking module 106 on the coordinator 110A may be configured to detect the mobile node 102G moving through the physical topology of the wireless network 100. The coordinator 110A may recognize the movement of the mobile node 102G by receiving successive introductory beacons 112 from the mobile node 102G through different router nodes 102 in the wireless network 100, for example. In another example, the mobile node 102G may embed supplementary information 114 in the introductory beacons 112 that indicates the device containing the node is a mobile device, which may be recognized by the coordinator 110A. Other methodologies may be imagined by one skilled in the art for the coordinator 110A to detect the movement of the mobile node 102G through the wireless network 100, and it is intended that this application include all such methodologies.

At block 420 (send suppression signal to nodes in network), upon detecting the movement of the mobile node 102G through the wireless network 100, the wireless networking module 106 on the coordinator 110A may be configured to send out a suppression signal 118 to the slave or child nodes 102A-102C of the coordinator 110A that will cause those nodes 102A-102C to ignore the introductory beacons 112 broadcast by the mobile node 102G. The message type, format, and content of the suppression signal 118 may depend on the specification or protocol of the wireless network 100. For example, in a ZIGBEE network, the coordinator 110A may broadcast a router table update message to the child nodes 102A-102C containing a significantly high cost value for communicating directly with the mobile node 102G as compared to other routes through the wireless network 100.

The child nodes 102A-102C in the ZIGBEE network, having a path to the mobile node 102G defined in their router tables, may be configured not to respond to the introductory beacons 112 broadcast by the mobile node 102G. In addition, because of the significantly high cost value for communicating directly with the mobile node 102G in their router table, the child nodes 102A-102C in the wireless network 100 may send some or all communications with the mobile node 102G through the coordinator 110A, instead of directly communicating with the mobile node 102G. Therefore, mutual knowledge between the nodes need not be established as in the case of the conventional discovery process.

At block 430 (multicast information regarding mobile node to other network coordinators), the wireless networking module 106 on the coordinator 110A may further be configured to send a hand-off message 120 to other coordinators, such as coordinator 110B shown in FIG. 1. The hand-off message 120 may contain information regarding the location or mobile nature of the mobile node 102G, allowing the other coordinators 110B to broadcast the suppression signal 118 to their child nodes, such as nodes 102D-102F. In this implementation, the coordinators 110 may operate similar to cell phone towers, passing along responsibility for handling the moving mobile node 102G from one coordinator to the next. After block 430, the process 400 may either repeat (e.g., periodically, continuously, or on demand as needed) or terminate.

It will be appreciated that the process 400 described above may require, in at least some implementations, the coordinators 110 of the wireless network 100 to be configured to recognize the moving mobile node 102G and to send the suppression signals 118 and hand-off messages 120, which may be beyond the specification or protocol of the wireless network 100. In addition, depending on the methodology utilized by the coordinator 110A to detect the moving mobile node 102G, several discovery processes may take place between some nodes 102 of the wireless network 100 and the mobile node 102G before the suppression signal 118 may be sent. In order for normal discovery to resume, the coordinator 110A may further start a timer upon sending the suppression signal 118, and once the timer expires, broadcast additional messages to clean-up the router tables of the other nodes 102 in the wireless network 100. In this way, the suppression of device discovery of the mobile node 102G may be temporary.

Figure 5:
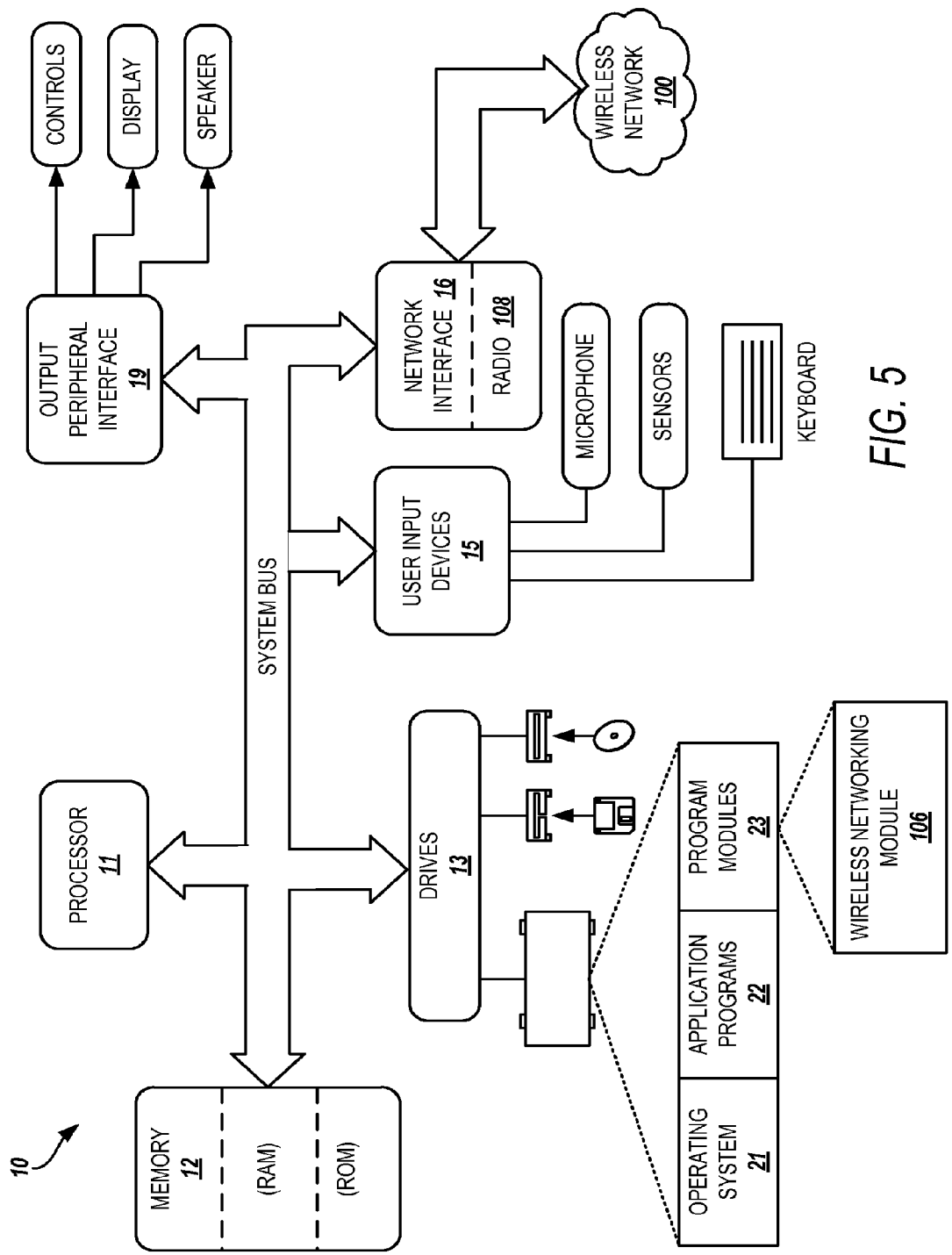
FIG. 5 is a block diagram illustrating an example computing device.

FIG. 5 is a block diagram illustrating an example computing device 10 arranged according to at least some embodiments presented herein. The computing device 10 may include a processor 11, a memory 12 and one or more drives 13. The drives 13 and their associated computer storage media may provide storage of computer readable instructions, data structures, program modules, and other data for the computing device 10. The computing device may be adapted to support embodiments for suppressing discovery of mobile devices in a wireless ubicomp network. For example, the computing device may include the mobile node 102G or the coordinator 110A in the wireless network 100 previously described herein. Various embodiments may include computers, dedicated hardware, or embedded computing devices.

The computing device 10 may be implemented as a conventional computer system, an embedded controller or processor, a laptop, a server computer, a mobile device, a set-top box, a kiosk, a vehicular information system, a mobile telephone, a customized machine, or some other hardware platform. The processor 11 may be a general purpose processor, a processor core, a multiprocessor, a multicore processor, a graphics processor, a digital signal processing (DSP) processor, a customized computing device implemented within an application specific integrated circuit (ASIC), a customized computing device implemented within a field programmable gate array (FPGA), a customized computing device implemented within any type of programmable logic, a state machine, a reconfigurable processor, any other processing unit, or any combination or multiplicity thereof. The processor 11 may support parallel dynamic optimization leveraging multicore processors as discussed herein.

The drives 13, other storage devices, or their associated computer-readable storage media may store an operating system 21, application programs 22, and program modules 23. The computing device 10 may include user input devices 15 through which a user may enter commands and data. Input devices may include physical sensors, a microphone, an electronic digitizer, a keyboard, a pointing device, or any combination thereof. Examples of pointing devices may include a mouse, trackball, light pen, touch screen, or touch pad. Other input devices to the computing device 10 may include a joystick, game pad, satellite dish, scanner, or the like. Input devices may be coupled to processor 11 through a user input interface that is coupled to a system bus. The input devices may also be coupled by other interface and bus structures, such as a parallel port, game port or a universal serial bus (USB). Computers such as computing device 10 may also include other peripheral output devices such as speakers, which may be coupled through an output peripheral interface 19 or similar interface.

The computing device 10 may operate in a networked environment using logical connections to one or more computers, such as a remote computer coupled to network interface 16. The remote computer may be a personal computer, a server, a router, a network PC, a peer device, or other common network node. The remote computer may include many or all of the elements described herein relative to the computing device 10. Networking environments may include wide-area networks (WAN), local area networks (LAN), intranets, the Internet, or combinations thereof.

When used in a LAN networking environment, the computing device 10 may be coupled to the LAN through the network interface 16 or a network adapter. When used in a WAN networking environment, the computing device 10 may include a modem or other mechanism for establishing communications over the WAN. The WAN may include the Internet, various other networks, or any combination thereof. It should be appreciated that other mechanisms of establishing a communications link, ring, mesh, bus, cloud, or network between computers may be used. According to some embodiments, the computing device 10 may connect to other nodes 102, coordinators 110, and other devices over the wireless network 100 through the network interface 16. The network interface 16 may include the radio 108 described above in regard to FIG. 1 to provide wireless networking services for the computing device 10 on the wireless network 100.

According to at least some embodiments, computing device 10 may be configured such that the processor 11 and/or program modules 23 may perform suppression of discovery of mobile devices in a wireless network in accordance with various embodiments presented herein. The computing device 10 may include one or more instances of a physical computer-readable storage medium or media associated with drives 13 or other storage devices. The system bus may enable the processor 11 to read code and/or data to/from the computer-readable storage media. The media may represent an apparatus in the form of storage elements that are implemented using any suitable technology, including but not limited to semiconductors, magnetic materials, optical media, electrical storage, electrochemical storage, or any other such storage technology. The media may represent components associated with memory 12, whether characterized as RAM, ROM, flash, or other types of volatile or nonvolatile memory technology. The media may also represent secondary storage, whether implemented as the storage drives 13 or otherwise. Hard drive implementations may be characterized as solid state, or may include rotating media storing magnetically-encoded information.

The storage media may include one or more program modules 23 for suppressing discovery of mobile devices in a wireless ubicomp network, such as the wireless networking module 106 described herein. The program modules 23 may include software instructions that, when loaded into the processor 11 and executed, transform a general-purpose computing system into a special-purpose computing device customized to facilitate all, or part of, the discovery suppression techniques disclosed herein. As detailed throughout this description, the program modules 23 may provide various tools or techniques by which the computing device 10 may participate within the overall systems or operating environments using the components, logic flows, and/or data structures discussed herein.

The processor 11 may be constructed from any number of transistors or other circuit elements, which may individually or collectively assume any number of states. More specifically, the processor 11 may operate as a state machine or finite-state machine. Such a machine may be transformed to a second machine, or specific machine by loading executable instructions contained within the program modules 23. These computer-executable instructions may transform the processor 11 by specifying how the processor 11 transitions between states, thereby transforming the transistors or other circuit elements constituting the processor 11 from a first machine to a second machine, wherein the second machine may be specifically configured to support secure wireless network pairing using radio channel metrics. The states of either machine may also be transformed by receiving input from one or more user input devices 15, network interfaces 16, other peripherals, other interfaces, or one or more users or other actors. Either machine may also transform states, or various physical characteristics of various output devices such as controllers, printers, speakers, video displays, or otherwise.

Encoding the program modules 23 may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage, or the like. For example, if the storage media are implemented as semiconductor-based memory, the program modules 23 may transform the physical state of the semiconductor memory 12 when the software is encoded therein. For example, the software may transform the state of transistors, capacitors, or other discrete circuit elements constituting the semiconductor memory 12.

As another example, the storage media may be implemented using magnetic or optical technology such as drives 13. In such implementations, the program modules 23 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. It should be appreciated that various other transformations of physical media are possible without departing from the scope and spirit of the present description.

Figure 6:
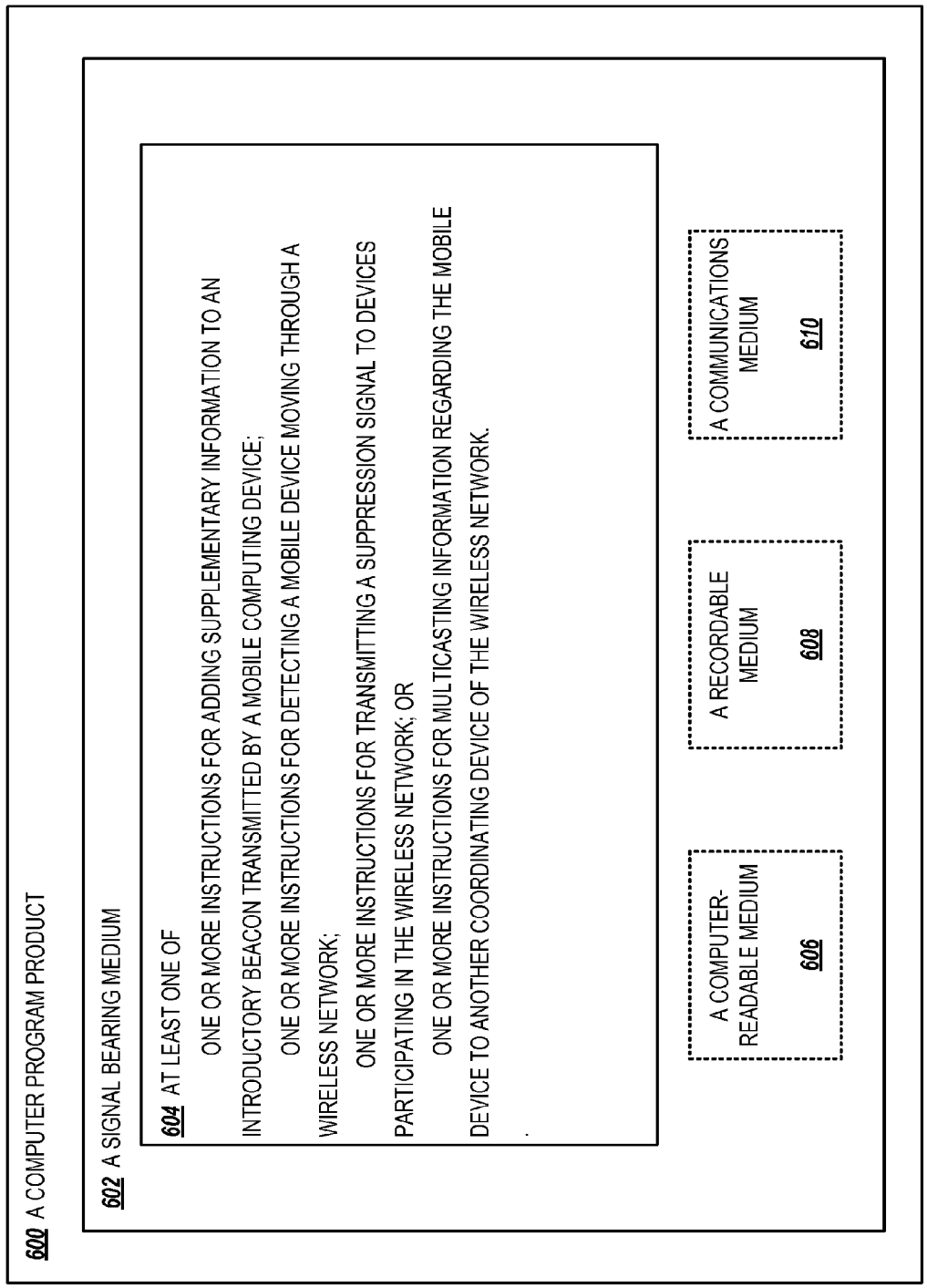
FIG. 6 is a schematic illustrating a partial view of an example computer program product that includes a computer program for executing a computer process on a computing device.

Turning now to FIG. 6, a schematic illustrates a partial view of an example computer program product 600 that includes a computer program for executing a computer process on a computing device, arranged according to at least some embodiments presented herein. An illustrative embodiment of the example computer program product is provided using a signal bearing medium 602, and may include at least one instruction of 604: one or more instructions for adding supplementary information to an introductory beacon transmitted by a mobile computing device; one or more instructions for detecting a mobile device moving through a wireless network; one or more instructions for transmitting a suppression signal to devices participating in the wireless network; or one or more instructions for multicasting information regarding the mobile device to another coordinating device of the wireless network.

The one or more instructions may be, for example, computer executable and/or logic implemented instructions. In some embodiments, the signal bearing medium 602 of the one or more computer program products 600 include a computer-readable medium 606, a recordable medium 608, and/or a communications medium 610.

In some implementations, signal bearing medium 602 may encompass a computer-readable medium 606, such as, but not limited to, a hard disk drive, a Compact Disc (CD), a Digital Video Disk (DVD), a digital tape, memory, etc. In some implementations, signal bearing medium 602 may encompass a recordable medium 608, such as, but not limited to, memory, read/write (R/W) CDs, R/W DVDs, etc. In some implementations, signal bearing medium 602 may encompass a communications medium 610, such as, but not limited to, a digital and/or an analog communication medium (e.g., a fiber optic cable, a waveguide, a wired communications link, a wireless communication link, etc.). Thus, for example, computer program product 600 may be conveyed to one or more modules of the described systems by an RF signal bearing medium 602, where the signal bearing medium 602 is conveyed by a wireless form of communications medium 610 (e.g., a wireless communications medium conforming with the IEEE 802.11 standard).

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, components, elements, apparatuses, or systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

In instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 elements refers to groups having 1, 2, or 3 elements. Similarly, a group having 1-5 elements refers to groups having 1, 2, 3, 4, or 5 elements, and so forth.

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

What is claimed is:

1. A computer-implemented method for reducing network transmissions in a wireless network of ubiquitous computing (ubicomp) devices, the method comprising:
   suppressing, by a computing device, a response of a first device participating in the wireless network to an introductory beacon transmitted by a mobile device moving through the wireless network,
   wherein the response of the first device to the introductory beacon transmitted by the mobile device is suppressed by receiving supplementary information added to the introductory beacon indicating that no response is necessary by devices participating in the wireless network except for a coordinating device of the wireless network.

2. The computer-implemented method of claim 1, wherein one or more devices participating in the wireless network being powered by a battery and configured to ignore introductory beacons containing the supplementary information indicating that no response is necessary.

3. The computer-implemented method of claim 1, wherein the supplementary information is added by the mobile device to an unused portion of the introductory beacon as defined in a standards specification for the wireless network.

4. The computer-implemented method of claim 1, wherein the response of the first device to the introductory beacon transmitted by the mobile device is further suppressed by the mobile device transmitting a malformed introductory beacon that is ignored by the devices participating in the wireless network except for a coordinating device of the wireless network.

5. The computer-implemented method of claim 4, wherein the coordinating device of the wireless network is configured to respond to the malformed introductory beacon transmitted by the mobile device causing the mobile device to initiate an introduction transmission directly with the coordinating device.

6. The computer-implemented method of claim 5, wherein the malformed introductory beacon transmitted by the mobile device comprises a router cost table update transmission defined in a standards specification for the wireless network.

7. The computer-implemented method of claim 1, wherein the response of the first device to the introductory beacon transmitted by the mobile device is further suppressed by a coordinating device of the wireless network detecting the mobile device moving through the wireless network and transmitting a suppression signal to the first device, and wherein the first device is configured to, upon receiving the suppression signal from the coordinating device, ignore the introductory beacon transmitted by the mobile device.

8. The computer-implemented method of claim 7, wherein the suppression signal transmitted by the coordinating device is a routing table update transmission defined in a standards specification for the wireless network having a high cost associated with the mobile device.

9. The computer-implemented method of claim 8, wherein the coordinating device is further configured to, upon detecting the mobile device moving through the wireless network, multicast information regarding the mobile device to another coordinating device of the wireless network.

10. The computer-implemented method of claim 1, wherein the wireless network comprises a ZIGBEE network.

11. A non-transitory computer-readable storage medium having computer-executable instructions stored thereon that, when executed by a mobile computing device participating in a wireless network, cause the mobile computing device to add supplementary information to an introductory beacon transmitted by the mobile computing device indicating that no response is necessary by devices participating in the wireless network except for a coordinating device of the wireless network, wherein at least one of the devices participating in the wireless network is configured to ignore the introductory beacon containing the supplementary information.

12. The non-transitory computer-readable storage medium of claim 11, wherein the supplementary information is added by the mobile computing device to an unused portion of the introductory beacon as defined in a standards specification for the wireless network.

13. The non-transitory computer-readable storage medium of claim 11, wherein the wireless network is a wireless personal-area network (WPAN).

14. The non-transitory computer-readable storage medium of claim 11, wherein the devices participating in the wireless network comprise ZIGBEE devices.

* * * * *